United States Patent [19]

Weaver

[11] Patent Number: 5,004,812

[45] Date of Patent: Apr. 2, 1991

[54] DIRECT POSITIVE DIMETHINE CYANINE DYES CONTAINING 1-ARYL-2-HETEROARYL INDOLE NUCLEUS

[75] Inventor: Thomas D. Weaver, Rochester, N.Y.

[73] Assignee: E. I. du Pont de Nemours and Company, Wilmington, Del.

[21] Appl. No.: 479,484

[22] Filed: Jan. 22, 1990

Related U.S. Application Data

[62] Division of Ser. No. 304,574, Jan. 31, 1989, Pat. No. 4,927,933, Division of Ser. No. 66,552, Jun. 26, 1987, Pat. No. 4,839,271.

[51] Int. Cl.$^5$ .......................................... C07C 401/00
[52] U.S. Cl. ................................................ 546/201
[58] Field of Search ........................................ 546/201

[56] References Cited

U.S. PATENT DOCUMENTS

| | | | |
|---|---|---|---|
| 2,759,935 | 8/1956 | Speeter | 546/201 |
| 2,872,453 | 2/1959 | Jacob et al. | 546/201 |
| 3,238,215 | 3/1966 | Zenitz | 546/201 |
| 3,501,312 | 3/1970 | Mee et al. | 96/106 |
| 3,505,070 | 4/1970 | Litzerman et al. | 96/102 |
| 3,580,911 | 5/1971 | Mee et al. | 260/240.65 |
| 3,592,653 | 7/1971 | Fumia et al. | 96/101 |
| 3,598,596 | 8/1971 | Chapman | 96/120 |
| 4,148,895 | 4/1979 | Lattrell et al. | 546/201 X |
| 4,939,159 | 7/1990 | Anderson et al. | 546/201 X |

FOREIGN PATENT DOCUMENTS

| | | | |
|---|---|---|---|
| 1520818 | 3/1968 | France | 546/201 |
| 804786 | 11/1958 | United Kingdom | 546/201 |

OTHER PUBLICATIONS

Pryer et al., Chemical Abstracts, vol. 60, #15873b (1964).
Huffman, J. Org. Chem., vol. 27, pp. 503 to 506 (1962).
Ockenden et al., Chemical Abstracts, vol. 48, #13682d (1954).

*Primary Examiner*—Floyd D. Higel

[57] ABSTRACT

Compounds as defined having a 1-phenylindole nucleus substituted in the 2-position with a 3-pyridyl group. Such compounds are useful in the preparation of cyanine dyes which can be used to sensitize silver halide emulsions for fogged direct-positive films.

2 Claims, No Drawings

DIRECT POSITIVE DIMETHINE CYANINE DYES CONTAINING 1-ARYL-2-HETEROARYL INDOLE NUCLEUS

This is a division of application Ser. No. 07/304,574, filed Jan. 31, 1989, now U.S. Pat. No. 4,927,933, which is a divisional of application Ser. No. 07/066,552, filed June 26, 1987, now U.S. Pat. No. 4,839,271.

TECHNICAL FIELD

This invention relates to desensitizing dyes used for fogged direct-positive emulsions. More particularly, this invention relates to dyes containing a desensitizing nucleus linked by dimethine to a 1,2-disubstituted indole and direct positive silver halide emulsions containing such dyes.

BACKGROUND OF THE INVENTION

Considerable technical effort has gone into research in the preparation of cyanine dyes which function as spectral sensitizers and electron acceptors in direct positive photographic silver halide emulsions to give direct-positive images of good quality. Examples of known direct positive cyanine dyes are disclosed in Litzerman et al., U.S. Pat. No. 3,505,070, one of the cyanine dyes containing a desensitizing nucleus linked by a dimethine chain to a 1-alkyl-2-pyridyl substituted indole nucleus wherein the attachment to said methine chain is by the 3-carbon atom of the indole nucleus; and Chapman, U.S. Pat. No. 3,598,596, one of the cyanine dyes containing a desensitizing nucleus linked by a dimethine chain to a 1-aryl-2-arylindole nucleus wherein the attachment to said methine chain is by the 3-carbon atom of the indole nucleus. While the dyes of Litzerman et al., and Chapman are said by the inventors to exhibit good sensitometric performance, in general the dyes, when used in direct-positive photographic film, have a tendency to produce undesirable stain after imagewise exposure and development thereof.

Thus, there is a need to overcome the aforementioned stain disadvantage of previous direct-positive cyanine dyes and yet retain the advantages of improved sensitivity in direct-positive silver halide emulsions.

DISCLOSURE OF THE INVENTION

In accordance with this invention, there is provided a fogged direct-positive photographic silver halide emulsion containing a sensitizing amount of at least one cyanine dye of the following general formula:

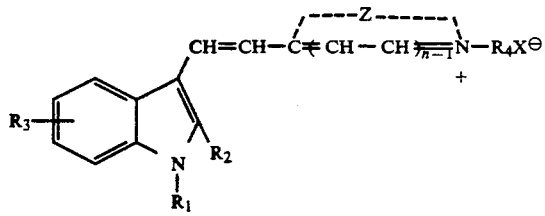

wherein $R_1$ is an aryl group of 6 to 10 carbon atoms;

$R_2$ is a heterocyclic azaaryl group of 6 to 10 carbon atoms;

$R_3$ is a member selected from the group consisting of a hydrogen atom, an alkyl group of 1 to 4 carbon atoms, an alkoxy group of 1 to 4 carbon atoms, an aryloxy group of 6 to 10 carbon atoms, a halogen atom and a nitro group;

$R_4$ is a member selected from the group consisting of an alkyl group of 1 to 4 carbon atoms; an alkyl group of 1 to 4 carbon atoms substituted with a member selected from the group consisting of halogen, nitrile, sulfonate, sulfate, hydroxyl, alkoxy, and carboxy; an alkenyl group of 1 to 4 carbon atoms and an aryl group of 6 to 10 carbon atoms;

n is a positive integer of from 1 to 2;

X is an acid anion; and

Z is the non-metallic atoms necessary to complete a desensitizing nucleus containing from 5 to 6 atoms in a heterocyclic ring.

In accordance with another embodiment of this invention, there is provided a cyanine dye of the following general formula:

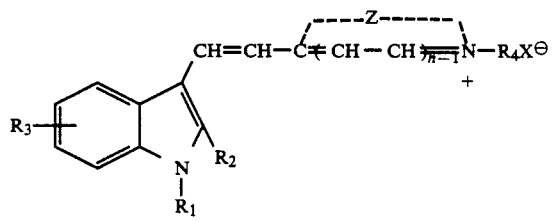

wherein $R_1$ is an aryl group of 6 to 10 carbon atoms;

$R_2$ is a heterocyclic azaaryl group of 6 to 10 carbon atoms;

$R_3$ is a member selected from the group consisting of a hydrogen atom, an alkyl group of 1 to 4 carbon atoms, an alkoxy group of 1 to 4 carbon atoms, an aryloxy group of 6 to 10 carbon atoms, a halogen atom and a nitro group;

$R_4$ is a member selected from the group consisting of an alkyl group of 1 to 4 carbon atoms; an alkyl group of 1 to 4 carbon atoms substituted with a member selected from the group consisting of halogen, nitrile, sulfonate, sulfate, hydroxyl, alkoxy and carboxy; and alkenyl group of 1 to 4 carbon atoms and an aryl group of 6 to 10 carbon atoms;

n is a positive integer of from 1 to 2;

X is an acid anion; and

Z is the non-metallic atoms necessary to complete a desensitizing nucleus containing from 5 to 6 atoms in a heterocyclic ring.

The dyes of the invention are useful in recording and duplication direct-positive silver halide films.

Silver halide grains useful in the emulsion of the invention may be produced by techniques well known in the art. They may be heterodisperse or monodisperse, produced by splash, double jet, conversion, or core-shell techniques, and may incorporate metal ion dopants to modify photographic response. The grains may be of the hybird type taught in U.S. Pat. No. 4,496,652. It is preferred to use silver bromoiodide prepared from a balanced, double-jet-type precipitation (about 0.2 μm edge length) containing about $8 \times 10^{-5}$ mole percent rhodium in about 190 g gelatin per mole of silver halide.

Fogging agents useful in preparing direct positive emulsions include amine boranes, boron hydrides, tin, gold and other reduction agents. A preferred fogging agent is cesium thiadecaborane. The emulsions can contain known antifoggants or stabilizers, e.g., 6-nitrobenzimidazole, benzotriazole, tetraazaindenes, etc., as well as the usual hardeners, e.g., chrome alum, formaldehyde, dimethylol urea, mucochloric acid, gloxal, etc. Other emulsion adjuvants may include covering power polymers, matting agents, plasticizers, toners, latices, optical brightening agents, surfactants, and the like. Organic halogen compounds as taught in Belgium Patent No. 876,734 are also useful with emulsions containing the cyanine dyes of this invention.

The cyanine dyes may be added to the emulsion as a final addition or allowed to absorb to the silver halide grains during a digestion step at the elevated temperature. A preferred embodiment of the invention is described in Example 1.

The emulsion is usually coated at about 0.4–3 g Ag/m² coating weight on a paper or a polyester base having an antihalation backing layer, and the emulsion hardened with formaldehyde. It is preferable to use 0.004 inch (0.10 mm) thick polyethylene terephthalate film coated on both sides with the subbing layer of Rawlins, U.S. Pat. No. 3,443,950 (vinylidene chloride-/alkyl acrylate/itaconic acid copolymer mixed with an alkyl acrylate and/or methacrylate polymer) overcoated with a thin substratum of gelatin. A conventional antihalation layer is preferably applied on one side and the sensitized, fogged emulsion of this invention on the opposite side of the film support. After drying, film strip samples of the resulting photographic film can be tested by exposure with a quartz-halogen lamp through a $\sqrt{2}$-step wedge. After exposure, the strips may be developed in any conventional developer (e.g., mixed hydroquinone/phenidone developing agent). One preferred developer contains the following ingredients:

| Ingredient | Amt. (g/l) |
|---|---|
| Sodium Metaborate | 19.8 |
| Sodium Sulfite | 244.4 |
| Sodium Carbonate | 35.7 |
| Sodium Hydroxide(45% soln.) | 151.9 |
| 5-Nitrobenzimidazole | 0.09 |
| Benzotriazole | 0.92 |
| 1-Phenyl-5-Mercaptobenzo-triazole | 0.10 |
| Hydroquinone | 111.0 |
| Phenidone | 5.95 |
| Potassium Bromide | 5.35 |
| pH | 11.6–12.0 |

Additional wetting agents, sequestrants, and adjuvants may also be incorporated in the developer, as known to those skilled in the art. Typically, the exposed strips are developed for about 30 seconds in the above developer at 95° F. (35° C.) followed by a 50 second water wash, and fixed for 30 seconds in a conventional ammonium thiosulfate fixer at a pH of about 5.4 and a temperature of 95° F. (35° C.). The fixed element is then washed 30 seconds in water and dried.

The dyes of the invention are described by the above general formula. It is necessary that $R_1$ attached to the nitrogen atom of the indole nucleus be an aryl group, e.g., phenyl, tolyl, naphthyl, methoxyphenyl, cholorophenyl, etc. $R_2$ can be a heterocyclic azaaryl group of 6 to 10 carbon atoms, e.g., pyridyl, such as 2-, 3-, 4-pyridyl, methyl substituted pyridyl or quinoline. $R_3$ can be a member selected from the group consisting of a hydrogen atom, an alkyl group of 1 to 4 carbon atoms, an alkoxy group of 1 to 4 carbon atoms, an aryloxy group of 6 to 10 carbon atoms, a halogen atom and a nitro. The desensitizing heterocyclic nucleus defined by Z in the above general formula contains from 5 to 6 atoms in a heterocyclic ring, e.g., a nitrobenzothiazole nucleus, e.g., 5-nitrobenzothiazole, 6-nitrobenzothiazole, 5-chloro-6-nitrobenzothiazole, etc.; a nitrobenzoxazole nucleus, e.g., 5-nitrobenzoxazole, 6-nitrobenzoxazole, 5-chloro-6-nitrobenzoxazole, etc.; a nitrobenzoselenazole nucleus, e.g., 5-nitrobenzoselenazole, 6-nitrobenzoselenazole, 5-chloro-6-nitrobenzoselenazole, etc.; an imidazo[4,5-b]quinoxaline nucleus, e.g., imidazo[4,5-b]quinoxaline, 1,3-dialkylimidazo[4,5-]-quinoxaline such as 1,3-diethylimidazo[4,5-b]-quinoxaline, 6-chloro-1,3-diethylimidazo[4,5-b]quinoxaline, etc., 1,3-dialkenylimidazo[4,5-b]quinoxaline such as 1,3-diallylimidazo[4,5-b]quinoxaline, 6,7-dichloro-1,3-diallylimidazo[4,5-b]quinoxaline, etc., 1,3-diarylimidazo[4,5-b]quinoxaline such as 1,3-diphenylimidazo[4,5-b]quinoxaline, 6-chloro-1,3-diphenylimidazo[4,5-b]quinoxaline, etc.; a 3,3-dialkyl-3H-pyrrolo[2,3-b]pyridine nucleus, e.g., 3,3-dimethyl-3H-pyrrolo-[2,3-b]pyridine, 3,3-diethyl-3H-pyrrolo[2,3-b]pyridine, etc., a 3,3-dialkyl-3H-nitrindole, e.g., 3,3-dimethyl-5-nitro-3H-indole, 3,3-diethyl-5-nitro-3H-indole, 3,3-dimethyl6-nitro-3H-indole, etc.; a thiazolo[4,5-b]quinoline nucleus; or a nitroquinoline nucleus, e.g., 5-nitroquinoline, 6-nitroquinoline, etc. Additional desensitizing nuclei defined by Z in the above formula include: nitrothiazole, nitronaphthothiazole, nitrooxazole, nitronaphthoxazole, nitroselenazole, nitronaphthoselenazole, and nitropyridine nuclei. $R_4$ can be an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc.; and substituted alkyl groups (preferably a substituted lower alkyl containing from 1 to 4 carbon atoms), such as a hydroxyalkyl group, e.g., $\beta$-hydroxyethyl, $\omega$-hydroxybutyl, etc.; an alkoxyalkyl group, e.g., $\beta$-methoxyethyl $\omega$-butoxybutyl, etc.; a carboxyalkyl group, e.g., $\beta$-carboxyethyl, $\omega$-carboxybutyl, etc.; a haloalkyl group, e.g., $\beta$-chloroethyl, $\beta$-bromoethyl, $\omega$-chlorobutyl, $\omega$-bromobutyl, etc.; a cyanoalkyl group, e.g., $\beta$-cyanoethyl, $\omega$-cyanobutyl, etc.; a sulfoalkyl group, e.g., $\beta$-sulfoethyl, $\omega$-sulfobutyl, etc.; a sulfatoalkyl group, e.g., $\beta$-sulfatoethyl, $\omega$-sulfatobutyl, etc.; an acyloxyalkyl group, e.g., $\beta$-acetoxyethyl, Y-acetoxypropyl, $\omega$-butyryloxybutyl, etc.; an alkoxycarbonylalkyl group, e.g., $\beta$-methoxycarbonylethyl, $\omega$-ethoxycarbonylbutyl, etc.; or an aralkyl group, e.g., benzyl, phenethyl, etc.; and the like; or an alkenyl group, e.g., allyl, 1-propenyl, 2-butenyl, etc.; or an aryl group, e.g., phenyl, tolyl, naphthyl, methoxyphenyl, chlorophenyl, etc. X represents an acid anion, e.g., chloride, bromide, iodide, sulfamate, perchlorate, p-toluenesulfonate, methyl sulfate, etc. $R_2$, noted above, may be a diazaaryl group of 6 to 10 carbon atoms, e.g., pyrazine.

The dyes of the present invention are prepared, for example, by reaction of a hetrocyclic compound of one of the following formulas, I or II:

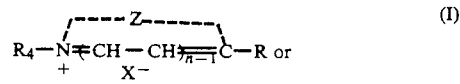

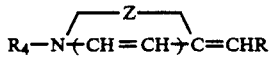 (II)

wherein R is H or $C_1$ to $C_4$ alkyl and $R_4$ and $X^-$ are as defined above, with an aldehyde of the following formula, III:

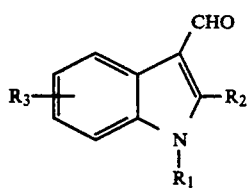 (III)

wherein $R_1$, $R_2$ and $R_3$ are as defined above, in a solvent such as acetic anhydride, in the presence of a molar equivalent of a protic acid, such as 4-methylbenzenesulfonic acid, or in the case of (II) above, with two molar equivalents of protic acid.

EXAMPLES

The following examples and controls illustrate but do not limit the invention. The parts and percentages are by weight.

EXAMPLE 1

Preparation of 2-[2-(1-phenyl-2-pyridin-3-ium-1H-indol-3-yl)ethenyl]-1,3,3-trimethyl-3-H-pyrrolo[2,3,-b]pyridinium bis(4-methylbenzenesulfonate) (dye 1)

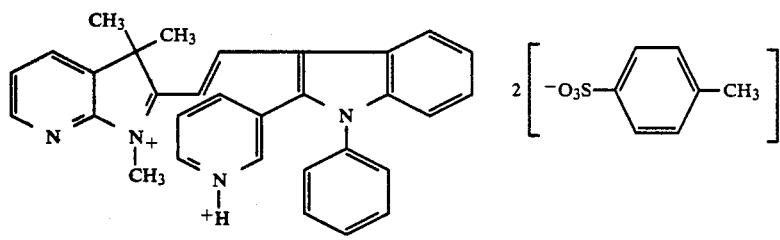

A solution of 1.73 g of 1,3,3-trimethyl-2-methylene-pyrrolo[2,3-b]pyridine, prepared as described by Ficken and Kendall, J. Chem. Soc., 3202 (1959), in 2 ml of acetic anhydride was added to a solution of 3.44 g anhydrous 4-methylbenzenesulfonic acid in 7.5 ml of acetic anhydride, followed by 3.0 g of 3-formyl-1-phenyl-2-(3-pyridyl)indole. The resulting mixture was stirred and heated at 135° C. for 1 minute. Volatile material was removed at 60°-70° C. under aspirator vacuum. The residual viscous liquid was dissolved in 35 ml of acetone. Ethyl acetate (50 ml) was added, followed by 50 ml of acetone (to get clear solution), and 1.5 ml of water to effect crystallization. The mixture was allowed to stand for 1 hour at room temperature. The solid dye was collected by sunction filtration, was washed with two portions of acetone, and was dried to give 6.6 g of crude dye. The crude dye was recrystallized from a mixture of 35 ml of 2-propanol and 100 ml of ethyl acetate to give 4.7 g of dye 1. Absorbance maximum (methanol): 496 nm (absorptivity, 59,900).

CONTROL 1

Preparation of 2-[2-(1-phenyl-2-{2-thiophenyl}-1H-indol-3-yl)ethenyl]-1,3,3-trimethyl-3-H-pyrrolo[2,3-b]pyridinium bis(4-methylbenzenesulfonate) (dye 2).

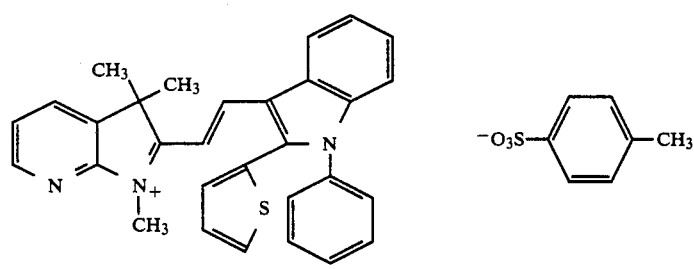

A solution of 1.73 g of 1,3,3-trimethyl-2-methylene-pyrrolo[2,3-b]pyridine in 3 ml of acetic anhydride was added to a solution of 1.72 g anhydrous 4-methylbenzenesulfonic acid in 5 ml of acetic anhydride, followed by 3.04 g of 3-formyl-1-phenyl-2-(2-thiophenyl)indole. The resulting mixture was stirred and heated at 135° C. for 1 minute, then was diluted with 60 ml of ethyl acetate and cooled to 0°-5° C. The solid product was collected by suction filtration, washed with ethyl acetate, and was combined with a second amount of solid obtained from concentration of the filtrate to give 6.26 g of damp crystals. Recrystallization from a mixture of 20 ml acetone, 2 ml methanol, and 40 ml ethyl acetate gave 3.88 g (61% theoretical) of dye 2 (absorbance maximum in methanol, 505 nm; absorptivity, 62,200), determined to be 95% pure by high-performance liquid chromatography.

CONTROL 2

Preparation of 2-[2-(1-methyl-2-pyridin-3-ium-1H-indol-3-yl)ethenyl]-1,3,3-trimethyl-3-H-pyrrolo[2,3-b]pyridinium bis(4-methylbenzenesulfonate) (dye 3).

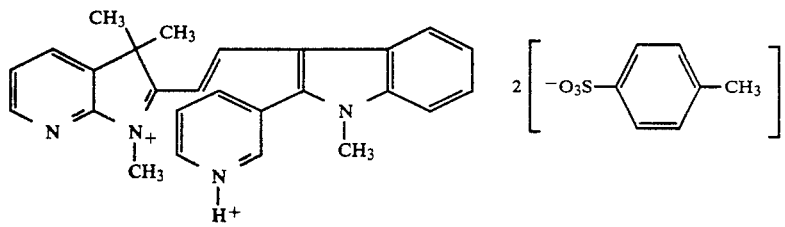

A solution of 0.57 g of 1,3,3-trimethyl-2-methylenepyrrolo[2,3-b]pyridine in 0.66 ml of acetic anhydride was added to a solution of 1.19 g anhydrous 4-methylbenzenesulfonic acid in 2.5 ml of acetic anhydride, followed by 0.779 g of 3-formyl-1-methyl-2-(3-pyridyl)indole. The resulting mixture was stirred and heated at 135° C. for 1 minute, then was heated at 70° C. under aspirator vacuum in a rotary evaporator to remove volatile material. The residue was dissolved in a mixture of 5 ml acetone, 6 ml of ethyl acetate, and 0.4 ml water. To this solution was added a solution of 0.933 g lithium tetrafluoroborate in 8 ml of 2-propanol. The resulting orange crystals were collected, washed with 2-propanol, and recrystallized from methanol to give 1.14 g (61% theoretical) of the tetrafluoroborate salt of dye 3. Absorbance maximum in 1% acetic acid/methanol, 498 nm; absorptivity, 68,400. This was converted to dye 3 (the 4-methylbenzenesulfonate salt) by stirring for 2 hours, a suspension of 0.100 g of the tetrafluoroborate salt in 3 ml of methanol with a 2-ml volume of Amberlyst A-27 ion exchange resin beads, a well-known ion exchange resin, in the 4-methylbenzenesulfonate form. The mixture was filtered, and the filtrate evaporated to give 0.139 g of dye 3 as a glass (absorbance maximum in 1% acetic acid/methanol, 498 nm; absorptivity, 70,000).

followed by 0.504 g of 3-formyl-2-(4-methoxy-phenyl)-1-phenylindole. The resulting mixture was stirred and heated at 135° C. for 1 minute, then was heated at 70° C. under aspirator vacuum in a rotary evaporator to remove volatile material. The residue was dissolved in a mixture of 5 ml of 2-propanol, was warmed on a steam bath, and to the resulting solution was added a solution of 0.20 g of lithium tetrafluoroborate in 2 ml of 2-propanol. The resulting solid was collected and was recrystallized from 20 ml of methanol to give 0.510 g (41% theoretical) the tetrafluoroborate salt of dye 4 with maximum absorbance in 1% acetic acid/methanol, 503 nm; absorptivity, 82,000. This was converted to dye 4 (the 4-methylbenzenesulfonate salt) by stirring, for 2 hours, a suspension of 0.10 g of the tetrafluoroborate salt in 3 ml of methanol with a 2-ml volume of ion exchange resin beads in the form described in Control 2. The mixture was filtered, and the filtrate evaporated to give 0.151 g of dye 4 as a glass (absorbance maximum in 1% acetic acid/methanol, 504 nm; absorptivity, 60,400).

CONTROL 4

Preparation of 2-(1,2-diphenyl-1H-indol-3-yl)ethenyl-1,3,3-trimethyl-3-H-pyrrolo[2,3-b]-pyridinium-4-methylbenzenesulfonate (dye 5).

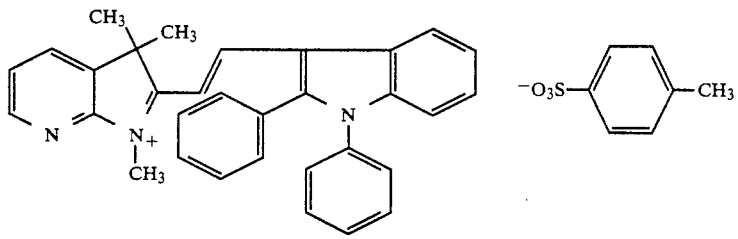

CONTROL 3

Preparation of 2-{2-[2-(4-methoxyphenyl)-1-phenyl-1H-indol-3-yl]ethenyl}-1,3,3-trimethyl-3-H-pyrrolo[2,3-b]pyridinium bis(4-methylbenzenesulfonate) (dye 4).

Dye 5, described in U.S. Pat. No. 3,598,596, was prepared by the procedure of Example 1, except that 3-formyl-1,2-diphenyl-1H-indole was used in place of the corresponding formylphenylpyridylindole.

CONTROL 5

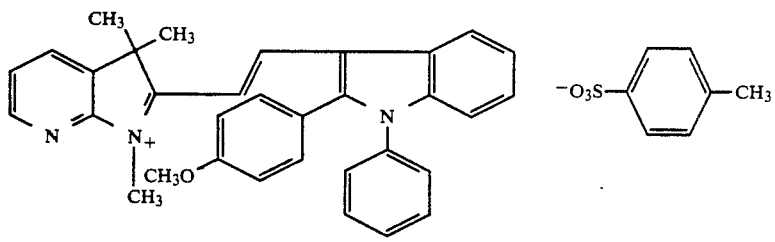

A solution of 0.33 g of 1,3,3-trimethyl-2-methylenepyrrolo[2,3-b]pyridine in 0.38 ml of acetic anhydride was added to a solution of 0.315 g of anhydrous 4-methylbenzenesulfonic acid in 1.44 ml of acetic anhydride, Preparation of 2-(1-methyl-2-phenyl-1H-indol-3-yl)ethenyl-1,3,3-trimethyl-3-H-pyrrolo[2,3-b]-pyridinium-4-methylbenzenesulfonate (dye 6).

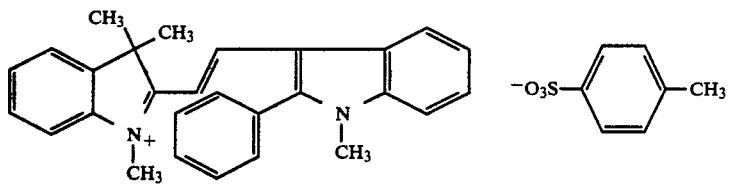

Dye 6 was prepared by the procedure of Example 1, except 3-formyl-1-methyl-2-phenyl-3H-indole was used in place of the formylphenyl pyridylindole.

The following examples show the preparation of intermediates used to prepare the dyes of the invention.

EXAMPLE 2

Preparation of 3-formyl-1-phenyl-2-(3-pyridyl)-1H-indole.

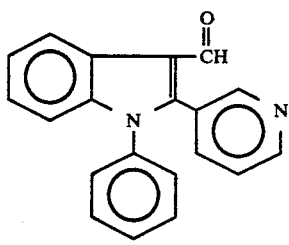

A solution of 12.0 g of 1-phenyl-2-(3-pyridyl)-1H-indole in 26 ml of dimethylformamide was added slowly to a solution of 5.4 ml of phosphorous-oxychloride in 19 ml of dimethylformamide, with cooling to maintain temperature between 5° and 10° C. during addition. The resulting solution was heated at 38° C. for 1.5 hours, then was poured into a mixture of 30 g of ice and 10 ml of water. The resulting mixture was stirred, and 120 ml of 10% sodium hydroxide was added over a 5 minute period, while adding ice to keep temperature below 50° C. Solid separated, and the mixture was heated at 75° C. for 5 minutes, cooled to 50° C., and the solid was collected, washed with hot methanol, and was recrystallized from 1:4 N,N-dimethylformamide:water to give 9.8 g (73% yield) of the formylphenylpyridylindole. The melting point is 185° C.

EXAMPLE 3

Preparation of 1-phenyl-2-(3-pyridyl)-1H-indole

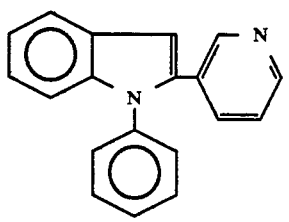

To 65.4 g of polyphosphoric acid, stirred and heated at 120° C., was added 21.6 g of acetylpyridinediphenylhydrazone in small portions at a rate to keep the reaction temperature at 130°-138° C. The resulting thick mixture was stirred and heated at 127°-130° C. for 2 hours, then was diluted with 200 ml of warm (55° C.) water. Stirring was continued for 10 minutes, during which the temperature rose to 70° C., and the polyphosphoric acid was hydrolyzed. A solution of 120 g of potassium hydroxide in 120 ml of water was added gradually along with ice as needed to keep the temperature between 60° and 70° C. The mixture was cooled to 35° C. and the organic phase was taken up in 120 ml of toluene. The toluene solution was dried with sodium sulfate and was evaporated to give a residue which was extracted with three 100-ml portions of hot heptane. The heptane extracts were combined, heated to near boiling, and were stirred with 5 g of alumina for 15 minutes. The hot solution was filtered and the filtrate was allowed to cool for 18 hours at 0°-5° C. The solid was collected, washed with hexane, and was allowed to dry to give 12 g of crude product which was recrystallized from methanol to give 10 g of the phenylpyridylindole, mp 113° C.

EXAMPLE 4

Preparation of acetylpyridine diphenyl hydrazone

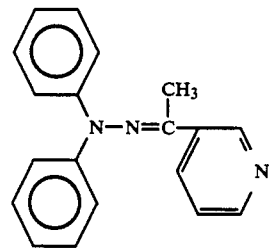

A mixture of 120 ml toluene, 80 ml hexane, 24.2 g acetylpyridine, 24.2 g of diphenylhydrazine hydrochloride, and 30 g of anhydrous sodium acetate was stirred and heated at reflux in a flask equipped with a water separator until no more water was being collected (about 2 hours). The reaction mixture was filtered, and the filtrate was distilled under aspirator vacuum at 60° C. The residue was stirred with 100 ml of methanol with cooling to keep temprature between −10° and −20° C. The resulting solid was collected, washed with 100 ml of cold methanol, and was dried in vacuo to give 43 g of acetylpyridine diphenylhydrazone, mp 84° C. λmax in methanol is 358 nm; absorptivity is $6.7 \times 10^3$.

EXAMPLE 5

An emulsion suitable for duplication was prepared with gelatin silver iodobromide (2.5%) grains and reduction fogged with gold chloride and cesium thiodecaborane. The emulsion was divided into portions to allow evaluation of direct positive dyes. Portions received dyes known in the art and served as controls, while other portions received dyes according to the present invention. Table 1 below contains results of sensitometric and dye stain tests run on films containing prior art and invention dyes. All films were given equal exposure and development conditions. Dye stain was evaluated in a formulation similar to the above, but containing silica matte (0.43 g/mole silver).

TABLE 1

| Example or Control (C) | Emulsion Contains (mol/mol Ag × 10³) | Rel. Speed | Sens. Max. | Dmin | Relative Dye Stain* |
|---|---|---|---|---|---|
| 1 | DYE 1 (0.87) | 100 | 533 nm | 0 | 1.0 |
| C1 | DYE 2 (0.87) | 100 | 540 nm | 0 | 4.2 |
| C2 | DYE 3 (1.0) | 51 | 535 nm | 0 | 0 |
| C3 | DYE 4 (0.87) | 100 | 545 nm | 0 | 3.6 |
| C4 | DYE 5 (0.93) | 100 | 535 nm | 0 | 4.2 |
| C5 | DYE 6 (1.1) | 71 | 535 nm | 0 | 2.6 |

*Determined by visible reflectance spectra.

As shown in the above table, a dye of the invention containing a pyridyl substituent in the 2-position of the indole nucleus and an aryl group on the 1-position of the indole nucleus exhibits lower stain than prior art dyes with a 2-aryl substituent on the indole nucleus (Controls 3, 4 and 5) or sulfur containing heterocyclic substitutent on the indole nucleus (Control 1). While the dye of Control 2 exhibits low stain, it and the dye of Control 5 impart lower photographic speed to a fogged direct positive photographic silver halide emulsion. This is believed to be attributed to the presence of the alkyl group rather than an aryl group, on the 1-position of the indole nucleus.

I claim:

1. 3-formyl-1-phenyl-2(3-pyridyl)-1H-indole having the formula:

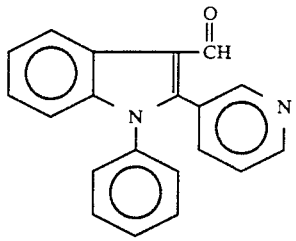

2. 1-phenyl-2-(3-pyridyl-1H-indole having the formula:

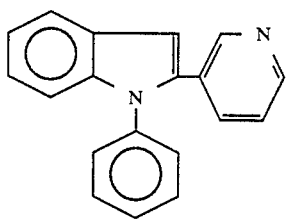

* * * * *